United States Patent [19]

Yarch

[11] Patent Number: 5,859,990
[45] Date of Patent: Jan. 12, 1999

[54] SYSTEM FOR TRANSFERRING DATA SEGMENTS FROM A FIRST STORAGE DEVICE TO A SECOND STORAGE DEVICE USING AN ALIGNMENT STAGE INCLUDING EVEN AND ODD TEMPORARY DEVICES

[75] Inventor: Mark A. Yarch, Chandler, Ariz.

[73] Assignee: Intel Corporation, Santa Clara, Calif.

[21] Appl. No.: 581,494

[22] Filed: Dec. 29, 1995

[51] Int. Cl.$^6$ .............................. H01J 13/00; G06F 7/64
[52] U.S. Cl. ......................... 395/311; 345/488; 345/853; 345/894
[58] Field of Search ..................................... 395/821, 488, 395/894, 853, 427, 182.01, 311; 345/126

[56] References Cited

U.S. PATENT DOCUMENTS

| | | | |
|---|---|---|---|
| 4,772,947 | 9/1988 | Kono | 358/135 |
| 4,848,744 | 7/1989 | Steininger et al. | 273/1 |
| 4,975,977 | 12/1990 | Kurosu et al. | 382/46 |
| 5,014,187 | 5/1991 | Debize et al. | 364/200 |
| 5,247,626 | 9/1993 | Firoozmand | 395/250 |
| 5,392,406 | 2/1995 | Petersen et al. | 395/325 |
| 5,394,553 | 2/1995 | Lee | 395/800 |
| 5,471,590 | 11/1995 | Melo et al. | 395/288 |
| 5,517,627 | 5/1996 | Peterson | 395/311 |

*Primary Examiner*—Thomas C. Lee
*Assistant Examiner*—Rehana Perveen
*Attorney, Agent, or Firm*—Blakely, Sokoloff, Taylor & Zafman

[57] ABSTRACT

The present invention provides an alignment logic circuit transferring segments of data from a first storage device to a second storage device. The segments of data are aligned in the first storage device, in a first and second dimension, according to a first configuration. The segments of data are aligned in the second storage device, in the first and second dimension according to a second configuration. The alignment logic circuit includes a first alignment stage, a second alignment stage, and an alignment control logic controls the first alignment stage such that the first alignment stage outputs data aligned in the first dimension according to the second configuration, and the second alignment stage outputs data aligned in the second dimension according to the second configuration.

It is also provided a computer system with a DMA controller with a Memory Write and Invalidate logic circuit. The Memory Write and Invalidate logic circuit generates a Memory Write and Invalidate enable signal when the DMA byte count is greater than a recall with a cacheline size, and the current transfer adders is a multiple of the cacheline size.

The present invention also provides a computer system including a host processor, a first bus coupled to the host processor, a second bus, slave circuit coupled to the second bus, and a direct memory access controller (DMA). The DMA performs DMA transactions between the first and second buses. The DMA controller includes a DMA error handling logic, coupled to the host processor, for receiving a retry signal indicative of a retry request of the slave circuit. The DMA error handling logic also receives an error signal indicative of an error on the first bus. The error handling logic aborts a DMA transfer when the error signal is asserted and the retry signal is deasserted.

10 Claims, 14 Drawing Sheets

FIG. 4-1

1  Alg33_22_11_00        <= (AdrAlgStartqlrx = AdrAlgEndqlrx) ;

2  Alg32_21_10_03        <= (AdrAlgStart = 0 and AdrAlgEnd =3) OR
                            (AdrAlgStart = 1 and AdrAlgEnd =0) OR
                            (AdrAlgStart = 2 and AdrAlgEnd =1) OR
                            (AdrAlgStart = 3 and AdrAlgEnd =2) ;

3  Alg31_20_13_02        <= (AdrAlgStart = 0 and AdrAlgEnd =2) OR
                            (AdrAlgStart = 1 and AdrAlgEnd =3) OR
                            (AdrAlgStart = 2 and AdrAlgEnd =0) OR
                            (AdrAlgStart = 3 and AdrAlgEnd =1) ;

4  Alg30_23_12_01        <= (AdrAlgStart = 0 and AdrAlgEnd =1) OR
                            (AdrAlgStart = 1 and AdrAlgEnd =2) OR
                            (AdrAlgStart = 2 and AdrAlgEnd =3) OR
                            (AdrAlgStart = 3 and AdrAlgEnd =0) ;

5  MuxOut (31 downto 24)
            <= AlgIn (31 downto 24) when Alg33_22_11_00 = '1' ELSE
               AlgIn (23 downto 16) when Alg30_23_12_01 = '1' ELSE
               AlgIn (15 downto  8) when Alg31_20_13_02 = '1' ELSE
               AlgIn ( 7 downto  0) ;

6  MuxOut (23 downto 16)
            <= AlgIn (31 downto 24) when Alg32_21_10_03 = '1' ELSE
               AlgIn (23 downto 16) when Alg33_22_11_00 = '1' ELSE
               AlgIn (15 downto  8) when Alg30_23_12_01 = '1' ELSE
               AlgIn ( 7 downto  0) ;

7  MuxOut (15 downto 8)
            <= AlgIn (31 downto 24) when Alg31_20_13_02 = '1' ELSE
               AlgIn (23 downto 16) when Alg32_21_10_03 = '1' ELSE
               AlgIn (15 downto  8) when Alg33_22_11_00 = '1' ELSE
               AlgIn ( 7 downto  0) ;

8  MuxOut ( 7 downto 0)
            <= AlgIn (31 downto 24) when Alg30_23_12_01 = '1' ELSE
               AlgIn (23 downto 16) when Alg31_20_13_02 = '1' ELSE
               AlgIn (15 downto  8) when Alg32_21_10_03 = '1' ELSE
               AlgIn ( 7 downto  0) ;

FIG. 4-2

9   EnB3Latqlr   <= (AdrAlgStart = 0                                     ) OR
                           (AdrAlgStart = 1 and AdrAlgEnd =1 or 2 or 3) OR
                         (AdrAlgStart = 2 and AdrAlgEnd =2 or 3)     OR
                         (AdrAlgStart = 3 and AdrAlgEnd =3           );

10   EnB2Latqlr   <= (AdrAlgStart = 0 and AdrAlgEnd =0 or 1 or 2) OR (AdrAlgStart = 2 and AdrAlgEnd =1 or 2 or 3) OR
                         (AdrAlgStart = 3 and AdrAlgEnd =2 or 3       );

11   EnB1Latqlr   <= (AdrAlgStart = 0 and AdrAlgEnd =0 or 1)      OR
                         (AdrAlgStart = 1 and AdrAlgEnd =0 or 1 or 2) OR
                         (AdrAlgStart = 2                        )   OR
                         (AdrAlgStart = 3 and AdrAlgEnd =1 or 2 or 3) ;

12   EnB0Latqlr   <= (AdrAlgStart = 0 and AdrAlgEnd =0)         OR
                         (AdrAlgStart = 1 and AdrAlgEnd =0 or 1)    OR
                         (AdrAlgStart = 2 and AdrAlgEnd =0 or 1 or 2) OR
                         (AdrAlgStart = 3                           );

FIG. 5a

| SRC/DEST ADDR. | MUX CONTROL | TEMPORARY FLIP FLOP ENABLE |
|---|---|---|
| 0 TO 0 | B3 TO B3 | S3 |
|  | B2 TO B2 | S2 |
|  | B1 TO B1 | S1 |
|  | B0 TO B0 | S0 |
| 0 TO 1 | B3 TO B0 | S3 |
|  | B2 TO B3 | S2 |
|  | B1 TO B2 | $\overline{S1}$ |
|  | B0 TO B1 | S0 |
| 0 TO 2 | B3 TO B1 | S3 |
|  | B2 TO B0 | S2 |
|  | B1 TO B3 | $\overline{S1}$ |
|  | B0 TO B2 | $\overline{S0}$ |
| 0 TO 3 | B3 TO B2 | S3 |
|  | B2 TO B1 | $\overline{S2}$ |
|  | B1 TO B0 | $\overline{S1}$ |
|  | B0 TO B3 | $\overline{S0}$ |
| 1 TO 0 | B3 TO B2 | $\overline{S3}$ |
|  | B2 TO B1 | S2 |
|  | B1 TO B0 | S1 |
|  | B0 TO B3 | S0 |
| 1 TO 1 | B3 TO B3 | S3 |
|  | B2 TO B2 | S2 |
|  | B1 TO B1 | S1 |
|  | B0 TO B0 | S0 |
| 1 TO 2 | B3 TO B0 | S3 |
|  | B2 TO B3 | S2 |
|  | B1 TO B2 | S1 |
|  | B0 TO B1 | $\overline{S0}$ |
| 1 TO 3 | B3 TO B1 | S3 |
|  | B2 TO B0 | S2 |
|  | B1 TO B3 | $\overline{S1}$ |
|  | B0 TO B2 | $\overline{S0}$ |

FIG. 5b

| SRC/DEST ADDR. | MUX CONTROL | TEMPORARY FLIP FLOP ENABLE |
|---|---|---|
| 2 TO 0 | B3 TO B1 | $\overline{S3}$ |
|  | B2 TO B0 | $\overline{S2}$ |
|  | B1 TO B3 | S1 |
|  | B0 TO B2 | S0 |
| 2 TO 1 | B3 TO B2 | $\overline{S3}$ |
|  | B2 TO B1 | S2 |
|  | B1 TO B0 | S1 |
|  | B0 TO B3 | S0 |
| 2 TO 2 | B3 TO B3 | S3 |
|  | B2 TO B2 | S2 |
|  | B1 TO B1 | S1 |
|  | B0 TO B0 | S0 |
| 2 TO 3 | B3 TO B0 | S3 |
|  | B2 TO B3 | S2 |
|  | B1 TO B2 | S1 |
|  | B0 TO B1 | $\overline{S0}$ |
| 3 TO 0 | B3 TO B0 | $\overline{S3}$ |
|  | B2 TO B3 | $\overline{S2}$ |
|  | B1 TO B2 | $\overline{S1}$ |
|  | B0 TO B1 | S0 |
| 3 TO 1 | B3 TO B1 | S3 |
|  | B2 TO B0 | S2 |
|  | B1 TO B3 | $\overline{S1}$ |
|  | B0 TO B2 | $\overline{S0}$ |
| 3 TO 2 | B3 TO B2 | $\overline{S3}$ |
|  | B2 TO B1 | S2 |
|  | B1 TO B0 | S1 |
|  | B0 TO B3 | S0 |
| 3 TO 3 | B3 TO B3 | S3 |
|  | B2 TO B2 | S2 |
|  | B1 TO B1 | S1 |
|  | B0 TO B0 | S0 |

SYSTEM FOR TRANSFERRING DATA SEGMENTS FROM A FIRST STORAGE DEVICE TO A SECOND STORAGE DEVICE USING AN ALIGNMENT STAGE INCLUDING EVEN AND ODD TEMPORARY DEVICES

BACKGROUND OF THE INVENTION

(1) Field of the Invention

The present invention relates to the field of computer systems architecture. More specifically, the present invention relates to an improved Direct Memory Access (DMA) controller.

(2) Description of Related Art

DMA controllers are used in computer systems for moving blocks of data from one location to another location, while relieving the host processor of the need to generate a long sequence of addresses to accomplish the transfer of data. The DMA controller is started by an event, and generates addresses of a source location wherein data is transferred to a destination location. Typically, the data transferred is a large block of data which begins at a source address and is moved to a destination beginning at a destination address.

In many storage devices such as memories, data can be stored on double-word boundaries, each double-word consisting of four bytes of data. In such memories, each read or write cycle, from or to the memory, involves accessing a double-word from either the source or the destination memory. Data, however, may be stored on boundaries other than double-word such as byte or word boundaries. However, a DMA transfer of a block of data between a source storage device and a destination storage device becomes more complicated when the starting address in the source storage device does not align on byte boundaries with the starting address in the destination storage device.

FIG. 1 shows a source storage device 2 storing a block of twelve bytes of data starting at address 000 0201H. This address corresponds to the address of the first byte of data of the block stored in the source storage device 2. The first byte of data of the block resides in the second byte location of the double word having the address 000 0200H. The block of data from the source storage device is received by the destination storage device 4 which stores this block beginning with the fourth byte of data of the double word having the address 4001 0300H. According to this configuration, a DMA controller would have to read bytes $B_1$, $B_2$, and $B_3$ of the first double word starting at address 000 0200H. Then, bytes $B_1$, $B_2$, and $B_3$ would be written in one cycle to a temporary storage device. The DMA controller would then, in another cycle, write byte $B_1$ in the destination storage device at address 4001 0303H. A second read operation from the source storage device would retrieve the double word starting at address 000 0204H. Bytes $B_4$ and $B_5$ would thus be stored in, the temporary storage device together, with bytes $B_2$ and $B_3$ aligned in the sequence $B_5$ $B_4$ $B_3$ $B_2$. However, bytes $B_6$ and $B_7$ read from address 000 0204H together with B5 and B4 would have to be read again from the source storage device in a next cycle because the temporary storage device would be full with the double-word $B_5$ $B_4$ $B_3$ $B_2$. As one can see, the discrepancy in alignment between the configuration of the block of data stored in the source storage device and the configuration of data to be stored in the destination storage device causes an additional read cycle penalty.

It is desirable to provide a faster and more efficient mechanism for aligning data from a source storage device into a destination storage device on byte, word, and double word boundaries. This is particularly critical in applications requiring transfer of blocks of data at high speed.

DMA controllers can be particularly useful in conjunction with a Peripheral Component Interconnect (PCI) system. Integration of a DMA controller into a PCI system, however, may require compliance with PCI protocols for transfer of data. For example, in a PCI system, according to the revision 7.1 of the PCI Special Interest Group located in Portland, Oreg., local memory to PCI transfers can be performed by means of two PCI write commands: Memory Write and Memory Write and Invalidate (MWI). The Memory Write (MW) can be used by a computer system in which a DMA controller is integrated to write data to a PCI agent. The Memory Write command is a command compatible with the PCI system architecture which is used to update data in the memory. A Memory Write and Invalidate (MWI) command is semantically identical to the Memory Write command except that it additionally guarantees a minimum transfer of one complete cacheline during the current transaction. According to this command, the master intends to write all bytes within an address cacheline in a single PCI transaction unless the master is interrupted by the target. This command allows a memory performance optimization by invalidating a dirty line in a write-back cache without requiring the actual write-back cycle, thus shortening access time. If the target, i.e., the PCI agent is cacheable memory, the Memory Write and Invalidate (MWI) command will improve the system performance. For more information about the PCI systems and the Memory Write and Invalidate command, see The PCI Local Bus Specification, revision 2.1 of the PCI Special Interest Group, located in Portland, Oreg.

In order to use the Memory Write and Memory Write and Invalidate commands on the PCI bus when a DMA transfer between local memory and PCI bus is desired, a DMA channel will have to be programmed by the application software. However, there are a number of circumstances which may prevent a DMA controller from actually initiating the MWI command. For example, to satisfy the PCI requirements for MWI, the PCI master such as a DMA controller would have to start a transaction on a cacheline boundary and transfer at least one cacheline of data without interruption. The application software would need to be responsible for compliance with the PCI requirements. Observance of the PCI requirements by the application software, however, poses significant overhead problems. The software would first have to be fairly complicated, and the system performance would be affected by the use of the respective software design. A hardware mechanism, providing full PCI compliance, of a DMA controller transferring data between a local and a PCI bus would be advantageous over software implementation due to improved system performance and ease of software design. It is, thus, desirable to provide for a hardware apparatus for implementing MWI and MW transfers of data on a DMA controller for transferring data between a local and a PCI bus.

Additionally, the implementation of a DMA controller in conjunction with a PCI system may be confronted with significant problems when errors on the local bus need to be handled. For example, if a local bus error occurs after a PCI retry is received from a slave circuit, the DMA controller may not be able to terminate the transfer. A retry request, in PCI compliant systems, is typically generated by a slave circuit to a master circuit, such as a DMA controller if the slave is unable to respond to a transaction at a current time. According to PCI revision 2.1, the DMA would first need to service the retry request. Otherwise, if the retry is not serviced, the PCI slave could lock up. An example of the need for a retry in PCI systems would be if the slave is currently locked for exclusive access by another master. The occurrence of a local bus error followed by a PCI retry poses the following problem. In order to avoid transferring data, which might contain errors, from the local bus to the PCI bus, it would be desirable to end the transfer when the error signal from the local bus is received. However, a transfer cannot be terminated until the retry is satisfied. In order to satisfy the retry, the DMA controller needs to prevent the host processor from noticing that an error has occurred. If the DMA controller would simply not convey the host processor the error message and service the retry from the slave which initially started the retry signal, then the host processor may still retain ownership over the PCI bus and, thus, the transfer of the block of data programmed to be transferred in a DMA transfer would continue. Continuing the transfer of data after having received an error message would, however, require sophisticated error handling logic. Such error handling logic would be expensive due to the complexity required.

It is, thus, desirable to provide for DMA error handling logic capable of handling a local bus error after a PCI retry request with minimum overhead. It is, also, desirable to provide for a mechanism capable of servicing a pending retry and aborting the DMA transfer in course once the retry was serviced such that additional error handling logic will not be required by the DMA controller.

BRIEF SUMMARY OF THE INVENTION

The present invention provides for an apparatus for transferring a number N of segments of data from a first storage device to a second storage device. The segments of data are aligned in the first storage device, in a first and a second dimension, according to a first configuration. The segments of data are aligned in the second storage device, in the first and second dimension, according to a second configuration. The apparatus, according to the present invention, includes a first alignment stage having, an input coupled to the first storage device, a control gate for receiving a first control signal, and an output. The apparatus, according to the present invention, further includes a second alignment stage having, an input coupled to the output of the first alignment stage, an output coupled to the second storage device, and a control gate for receiving a second control signal. The alignment logic circuit also includes an alignment control logic for generating the first and second control signals. The first alignment stage supplies at its output, in response to the first control signal, the segments of data aligned in a first dimension according to the second configuration. The second stage supplies at its output, in response to the second control signal, the segments of data aligned in a second dimension according to the second configuration.

The present invention further provides for a computer system including a first storage device partitioned into a plurality of bytes and into a plurality of storage lines, each storage line including a first predetermined number N of bytes. The computer system, according to the present invention, further includes a second storage device and a direct memory access controller (DMA) for transferring data between the first storage device and the second storage device. The DMA controller includes a first circuit for storing a DMA byte count, a second circuit for storing the predetermined number N, a third circuit for storing a current transfer address, and a Memory Write and Invalidate (MWI) logic circuit. The Memory Write and Invalidate logic circuit is coupled to the first, second, and third circuits, for generating an MWI enable signal when the DMA byte count is greater than or equal with the predetermined number N and the current transfer address is a multiple of the number N.

Yet, in another aspect of the present invention, it is provided a computer system including a host processor, a first bus coupled to the host processor, a second bus, a slave circuit coupled to the second bus, and the direct memory access controller (DMA). The DMA performs DMA transactions between the first and second buses. The DMA controller includes a DMA ERROR handling logic, coupled to the host processor, for receiving a RETRY signal indicative of a RETRY request of the slave circuit. The DMA ERROR handling logic also receives an ERROR signal indicative of an ERROR on the first bus. The ERROR handling logic aborts a DMA transfer when the ERROR signal is asserted, and the RETRY signal is deasserted.

BRIEF DESCRIPTION OF THE DRAWINGS

The features, aspects, and advantages of the present invention will become more fully apparent from the following detailed description, appended claims, and the accompanying drawings in which:

FIG. 4 displays a pseudo-code listing of an alignment control logic according to the present invention;

FIGS. 5a and 5b show in a tabular representation the configuring of the control signals to the first and the second alignment stage of the apparatus according to the present invention;

DETAILED DESCRIPTION OF THE INVENTION

Figure 1:
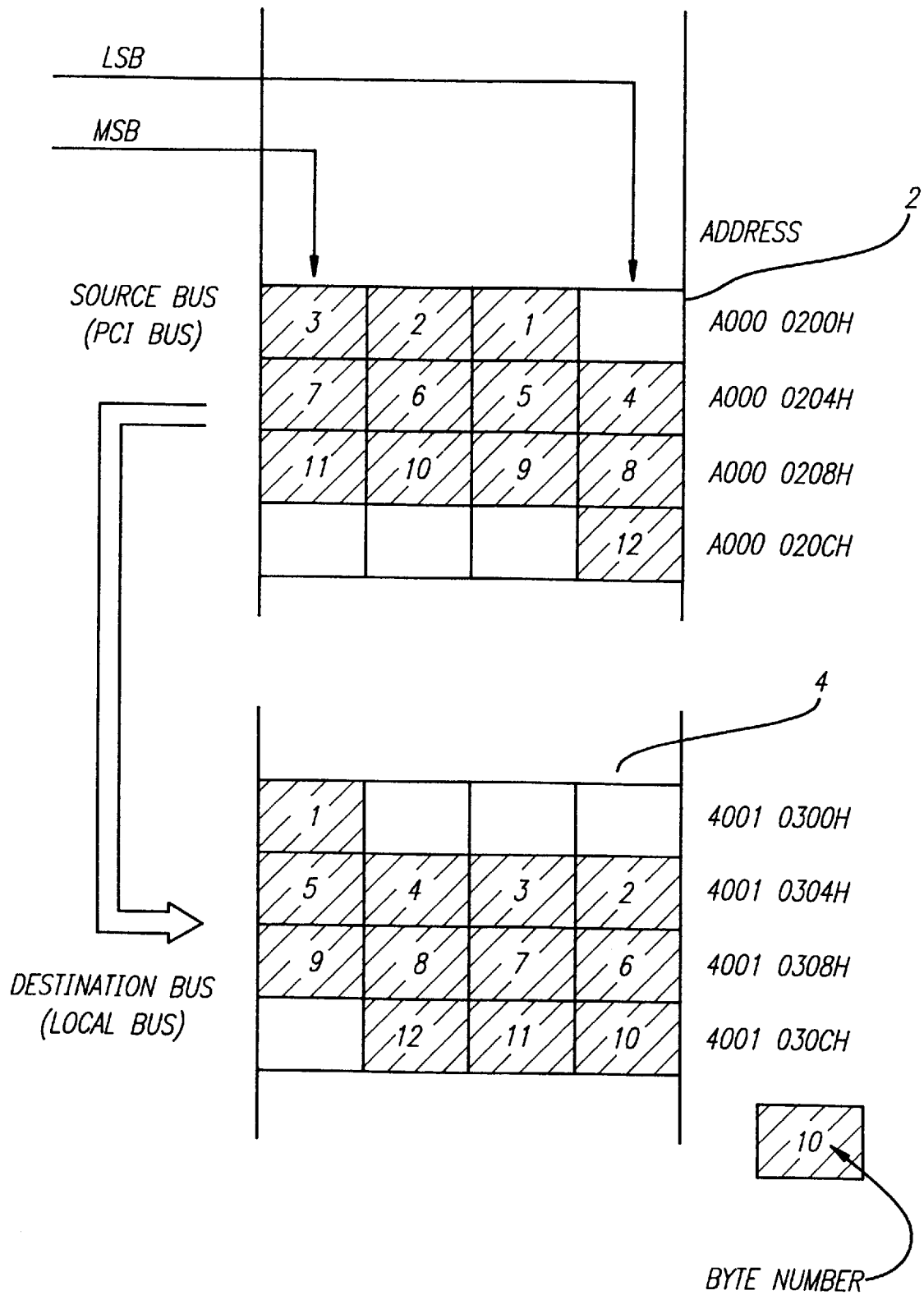
FIG. 1 shows a source storage device having data arranged in a first configuration, and a second storage device having data arranged in a second configuration.

In the following description, numerous specific details are set forth to provide a thorough understanding of the present invention. However, one having an ordinary skill in the art may be able to practice the invention with the specific details. In some instances, well-known circuits, structures, and techniques have not been shown in detail not to unnecessarily obscure the present invention.

FIG. 2 illustrates an alignment logic 200 for transferring data according to the present invention. This configuration will be explained hereinafter in conjunction with a DMA controller transferring data between a local bus coupled to a local memory and a queue coupled to a PCI bus. However, the present invention is not limited to a DMA controller. The present invention can be utilized in conjunction with other devices wherein data is transferred between a first storage device and a second storage device.

A multiplexer 206 is coupled at an output 210 thereof, via a first bus 218, to the apparatus for transferring data, according to the present invention. Multiplexer 206 is coupled at an input 211 thereof to both a storage device 202, which can be a local memory, and to a second storage device 204, which can be a queue of a DMA controller or a storage device coupled to a PCI bus (not shown). As one can see, the apparatus 200 offers the possibility for transferring data from both a PCI bus to a local bus and from a local bus to a PCI bus. The multiplexer 206 has a control input 208 for receiving a signal, $PCI_{WRITE}$ indicating whether a transfer is directed from the local bus to the PCI bus or vice versa. According to this signal data, from either the local storage device 202 or from the PCI storage device 204, is selectively gated via output 210 of the multiplexer to the apparatus 200 via the first bus 218.

For purposes of the following description, one will assume that the source storage device 202 has data arranged according to the configuration of the data in the source storage device 2 shown in FIG. 1 and the destination storage device 204 will store data transferred from the source storage device according to the configuration of the destination storage device 4 shown in FIG. 1. A data configuration is hereinafter defined as an arrangement of bytes of data in a storage device having a two-dimensional structure, i.e., divided in columns and rows. A data configuration is determined by the position (row-wise and column-wise) of the first byte of data of a block and by the number of rows storing the data of the block. As one can see in FIG. 1, data is aligned in both the source storage device and the destination storage device according to a row and a column. For example, byte number 5, in the source storage device 2, is aligned in a first data configuration in row 2, column 2. However, byte number 5 is aligned in the second configuration, in the second storage device 4, in row 2, column 4. Hereinafter, the source storage device and the destination storage device will be denominated as the first storage device and the second storage device.

The alignment logic circuit 200 of FIG. 2 includes a first alignment stage 212 having an input 214 coupled to the first storage device (202 or 204) via the multiplexer 206. In the preferred embodiment shown in FIG. 2, the first stage 212 includes four 8-bit-wide 4/1 multiplexers. The number of multiplexers of the first stage equals the number of segments of data or bytes that can be found in each row of each of the storage devices. Since there are four bytes of data, in each row of the first and the second storage devices, the first stage 212 of the alignment logic will include four multiplexers 216. However, the present invention is not limited to storage devices containing four bytes of data on each row and, thus, is not limited to four multiplexers in the first stage. The number of bytes in a row can vary according to the desired application. In such case, the number of multiplexers 216 will equal the number of bytes of data contained in each row of the first and second storage devices.

The alignment logic 200 further includes a first bus 218 coupled to the multiplexer 206. The first bus 218, in this particular embodiment, includes four 8-bit lines L(i) 220 where i=0 through 3. In general, for storage devices including N bytes of data in each row, the first bus 218 will include N 8-bit lines L(i) for i=0 through N−1. Each of the lines 220 correspond to one byte B(i) of the first storage device for i=0 through N−1. As one can see in this figure, each of the line L(i) 220 will thus drive one byte of data B(i) having a position identified by the index i. Each of the multiplexers 216 has an input 222 coupled to one of the lines L(i) for i=0 through N−1. In this particular embodiment, multiplexers 216 have four 8-bit inputs 222, each input being coupled to a corresponding line 220 L(i). For example, multiplexer M3 has a first 8-bit input 222 coupled to the line L(0), a second input 223 coupled to the line L(1), a third input 224 coupled to the line L(2), and a fourth input 225 coupled to the line L(3). The other multiplexers M0, M1, and M2 are coupled in the same way to the lines L(0), L(1), L(2), and L(3). In such way, each multiplexer 216 can receive, at one time, all four bytes of data stored in one row of the first storage device 202. However, only one of the inputs of each of the multiplexer 216 is selectively supplied at the output 226 of each multiplexer.

An alignment control logic 228 is coupled to the first stage 214 via line 230. Line 230 is a 4-bit line, in this particular embodiment, wherein each bit line is coupled to a different control gate 232 of the multiplexers 216. The alignment control logic 228 is programmed before the transfer of data from the first storage device to the second storage device is initiated. The alignment control logic 228 is programmed for generating a 4-bit signal via line 230 such that one of the bytes B0 through B3, driven by the lines L(0)–L(3), will be selectively supplied at the output 226 of the multiplexers 216. The byte supplied by each multiplexer 216 at the output 226 is selected by the signal driven by the alignment logic such that this byte will be positioned in the sequence of the four multiplexers, in a position corresponding to the same columns that this byte would occupy in the second configuration. Accordingly, multiplexers 216 will generate at their output a double word aligned in the first dimension, i.e., aligned column-wise, according to the position that this double word would have in the second configuration of the second storage device.

FIG. 1 shows 12 bytes of data aligned in a first configuration. According to the first configuration of the first storage device shown in FIG. 1, the first byte of data starts at column 1, which is the second column from the right. The row wherein this byte resides will be denominated as the first row, i.e. row 0. As one can see, the first byte of data is aligned in the first dimension in column 1, while this byte of data is aligned in the second dimension in row 0. The second byte of data is aligned in the first dimension in column 2 and in the second dimension in column 0, while the third byte of data is aligned in column 3, row 0.

Once the first row of data of the first storage device 2 of FIG. 1 is read out of that device, the alignment control logic 228, in conjunction with the first alignment stage including multiplexers 216, will align the bytes B1, B2 and B3, column-wise according to the second configuration. Accordingly, B1 will be gated at the output of the multiplexer M3, B2 will be gated at the output of the multiplexer M0, and the B3 will be gated at the output of the multiplexer M1. As one can see, the first stage, controlled by the alignment control logic 228, takes care of aligning data columnwise. The next step is aligning data according to the rows in which this data is to be found in the second configuration of the second storage device 4 of FIG. 1. For example, the alignment in the second dimension, i.e., row-wise, according to the second configuration, demands that the first byte B1 resides in row 0, while the bytes B2 and B3 reside in row 1. A second alignment stage 240, responsible for alignment according to rows, has an input 242 coupled to the output of the first alignment stage 212 and an output 244 coupled to the second storage device. Additionally, the second alignment stage 240 includes a control gate 244. The control gate 244 is coupled to the alignment control logic 228 for receiving, via line 242, a row align signal. In response to this signal, the second alignment stage 240 generates, at its output 244, bytes of data aligned in a second dimension, i.e., row-wise, according to the second configuration.

The output 244 of the second alignment stage 240 is coupled to the second storage device via four 8-bit output lines 0(i) for i=0 through N−1. In this particular example, N is 4. Each of the lines 0(i) for i=0 through 3 is coupled to the second storage device such that a byte of data residing, at the output of the second alignment stage, in the $i^{th}$ position can be written into the second storage device at a location corresponding to a column having the $i^{th}$ position in a respective row. Accordingly, the second alignment stage 240 will output, in each cycle, data aligned, both in the first and the second dimension, according to the configuration of the destination of the second storage device. In this case, in one cycle, the output line 0(3) will drive byte B1 of the first storage device. The lines 0(2), 0(1), and 0(0), respectively, will contain "don't care" data. In the next cycle, the output lines 0(3), 0(2), 0(1), and 0(0) will contain the sequence of bytes B5, B4, B3 and B2.

The second alignment stage 240 includes an odd temporary storage device 248 S(i) and an even temporary storage device 246 $\overline{S}$(i) for i=0 through 3. The odd temporary storage device 248 includes, by way of non-limiting example, four flip-flops $S_0$, $S_1$, $S_2$ and $S_3$. The even temporary storage device $\overline{Si}$ includes four flip-flops, $\overline{S0}$, $\overline{S1}$, $\overline{S2}$ and $\overline{S3}$. Each of the flip-flops 246 and 248 include a control gate 244 which is coupled to the alignment control logic 228 via line 242. The alignment control logic 228 is adapted to generate enable signals via line 242 such that each of the temporary storage devices, the even and the odd, will contain four bytes of data belonging to two consecutive rows of data of the second configuration.

The operation of the second alignment logic in conjunction with the alignment control logic will be explained in conjunction with FIG. 2b. As one can see from FIG. 2b, in one clock cycle, the first row including bytes B1, B2, and B3 of the first storage device 2 shown in FIG. 1 will be written to the temporary storage devices S(i) and $\overline{S}$(i). More specifically, byte B1 will be latched into the flip-flop S3, byte B2 will be latched into the flip-flop $\overline{S0}$, and byte B3 will be latched into the flip-flop $\overline{S1}$. The alignment control logic 228 (not shown in this figure) generates control signals Enbilatqlr to the gates 244 of the flip-flops S(i) and $\overline{Si}$ for i=0 through 3. In the implementation of FIG. 2b, flip-flops S3, $\overline{S1}$, and $\overline{S0}$ receive control signals having logic level '0.' The alignment control logic 228 (not shown) is also adapted to generate control signals to a second set of multiplexers 250. Multiplexers 250 are coupled to the odd and even temporary storage devices as shown in FIG. 2b. As one can see, at one time, the alignment control logic 228 will generate a third control signal via line 252 to the output of multiplexers 250. The alignment control logic 228 generates each cycle low and high control signals to the multiplexers 250 such that each cycle a different input of the multiplexer 250 will be selected at the output of these multiplexers. According to this scheme, in each cycle, the output multiplexers 250 will select data stored in either the odd temporary storage device or the even temporary storage device. In the particular example shown in FIG. 2b, alignment control logic 228 generates a logic 1 signal on line 252, thereby selecting the odd temporary storage device $S_0$–$S_3$. Accordingly, multiplexers 250 will output a double word of data in the sequence $B_1$XXX, where X is a "don't care."

In the next cycle, a second row of data residing at address 000 0204H, in the first storage device 2 shown in FIG. 1, will be read from this storage device. Multiplexers 216, will receive control signals, from the alignment control logic 228, such that these multiplexers will gate at their output the four bytes of the second row of data of the first storage device in the sequence B5, B4, B7, and B6. As one can see, the sequence B5, B4, B7, and B6 is aligned in the first dimension, i.e., columnwise, according to the configuration stored in the second storage device 4 of FIG. 1. The alignment control logic 228 will also generate a second control signal to the temporary storage devices S(i) and $\overline{S}$(i). The second control signal generated via line 242 will enable the flip-flops $\overline{S3}$ to store byte B5, $\overline{S2}$ to store B4, S1 to store B7, and S0 to store B6, as one can see from FIG. 2c.

Figure 2A:
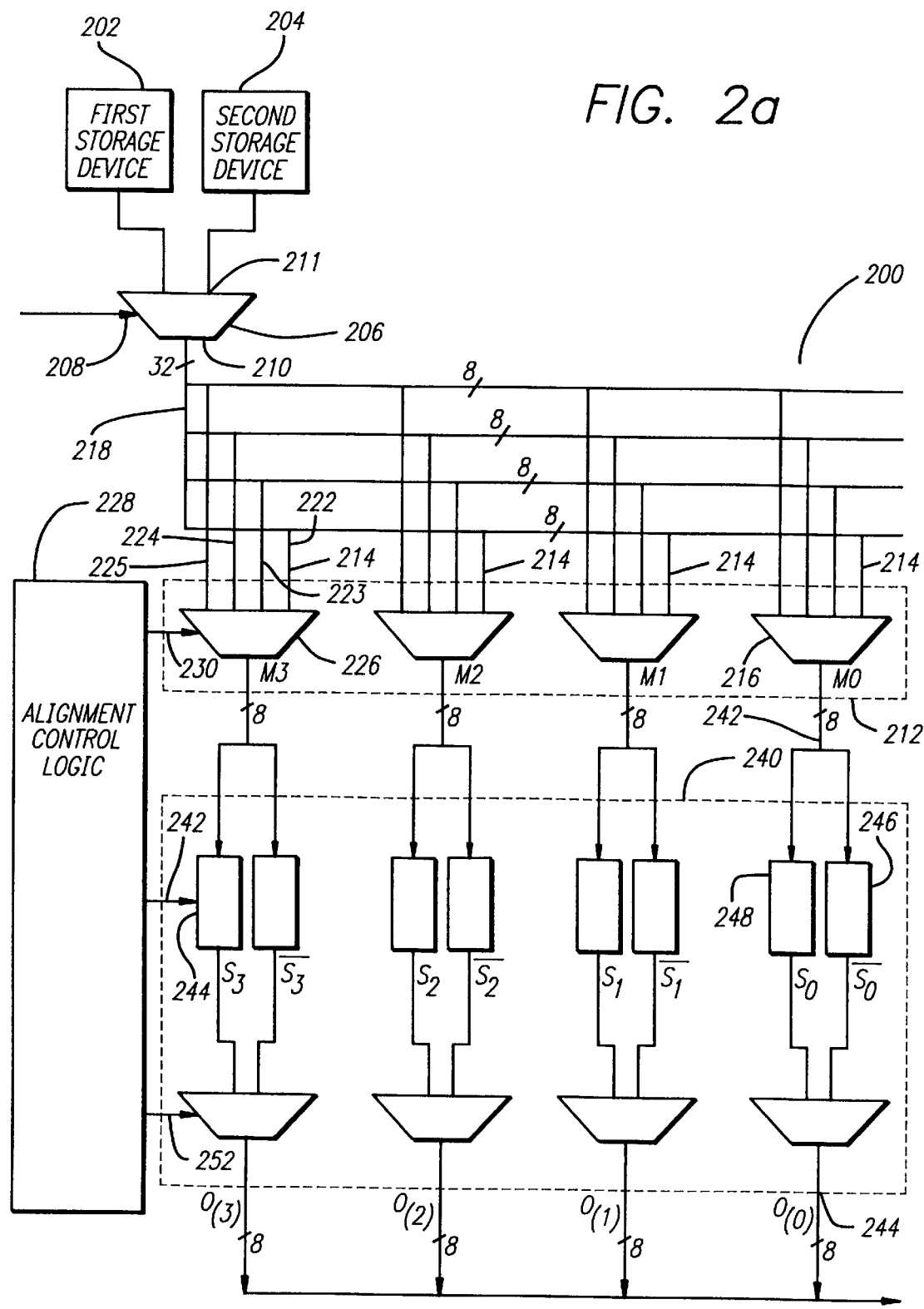
FIG. 2a illustrates an embodiment of the apparatus for transferring data according to the present invention.
Figure 2B:
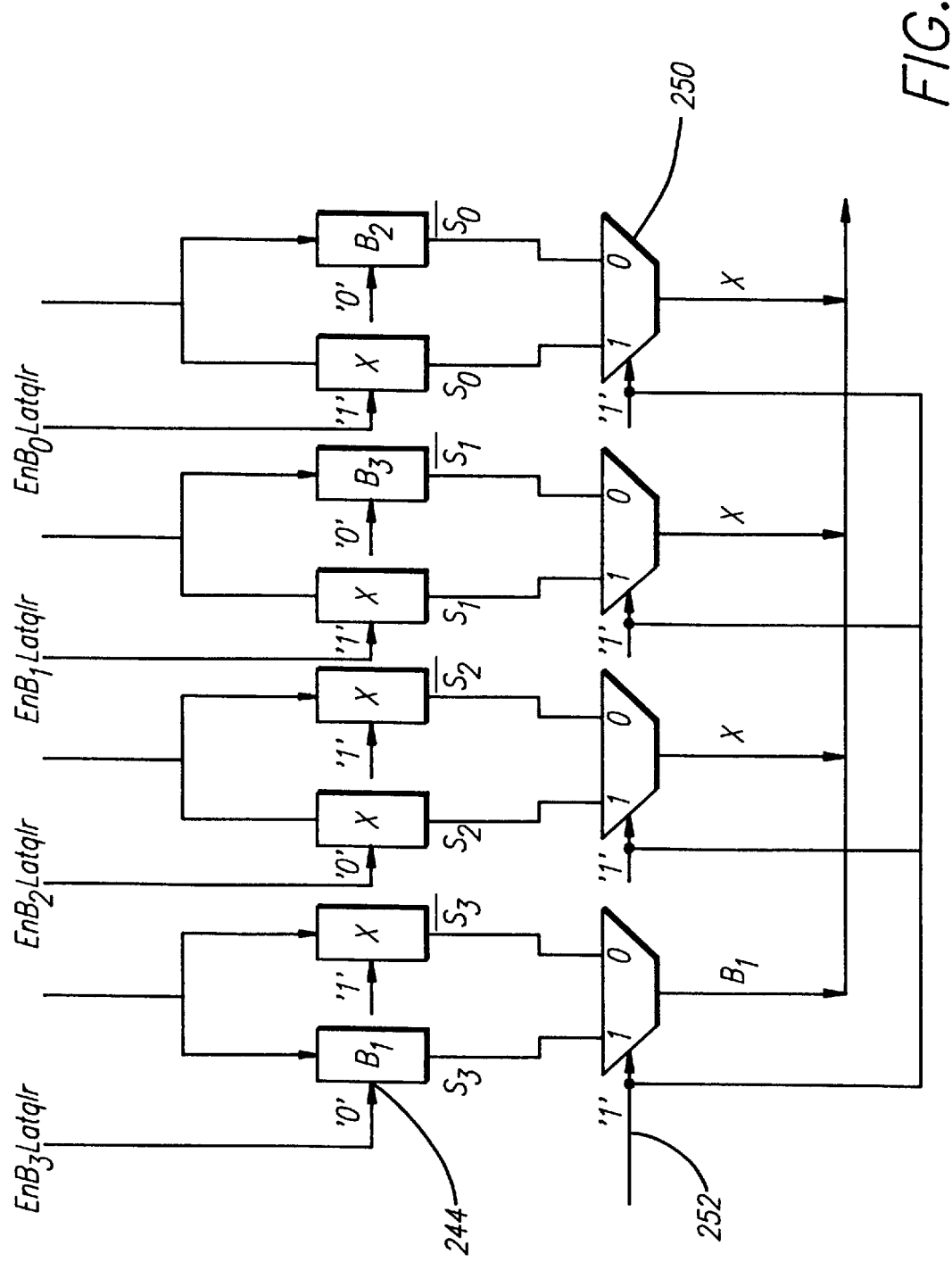
FIG. 2b illustrates in more detail the operation of the second alignment stage of the apparatus according to the present invention.
Figure 2C:
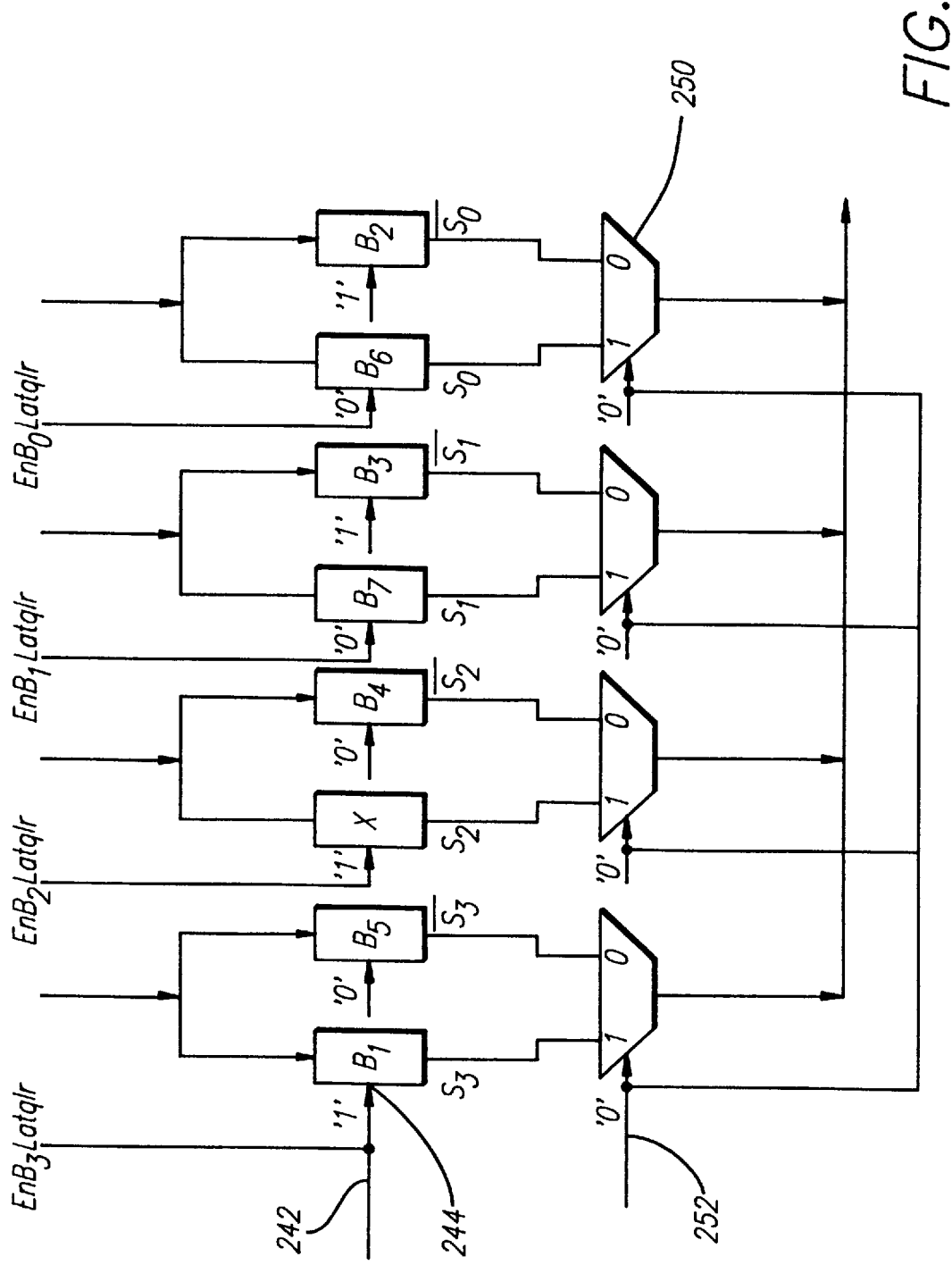
FIG. 2c further illustrates the operation of the second alignment stage of the apparatus according to the present invention.

FIG. 2c shows the content of the temporary storage devices of the second alignment data after the second row of data has been read from the first storage device 2 of FIG. 1. As one can see, the second alignment stage stores in the flip-flops $\overline{S3}$, $\overline{S2}$, $\overline{S1}$ and $\overline{S0}$, the bytes B5, B4, B3, and B2, respectively. Bytes B2, B3, B4, and B5 are aligned according to the second row of the configuration shown in the second storage device 4 of FIG. 1. The alignment control logic 228 also generates a third control signal to the multiplexers 250 which causes selection of the odd temporary storage devices $\overline{S0}$, $\overline{S1}$, $\overline{S2}$, and $\overline{S3}$ by such that the double word B5, B4, B3, and B2 will be written to the second storage device 4 of FIG. 1.

Additionally, bytes B6 and B7 are also written into the temporary storage devices of the second alignment stage concomitantly with bytes B4 and B5. As one can see from FIG. 2c, B6 is stored in flip-flop S0, while B7 is stored in flip-flop S1. In so doing, the apparatus of the present invention overcomes the deficiencies associated with devices having only one temporary storage device which would require a second reading of the data stored in the second row of the first storage device 2 of FIG. 1. As mentioned earlier in this application, a circuit having only one temporary storage device would have to re-read the second row of data of the first storage device because the temporary storage device would become full after bytes B2, B3, B4, and B5 were stored therein. The apparatus according to the present invention, thus, overcomes this deficiency by providing both an additional set of temporary storage registers, i.e. odd and even temporary storage devices and the multiplexers 250. Moreover, the alignment control logic 228 which generates control signals to the temporary storage devices S(i) and $\overline{S}$(i) and to multiplexers 250, takes into account the configurations of both the first storage device and the second storage devices.

Figure 3:
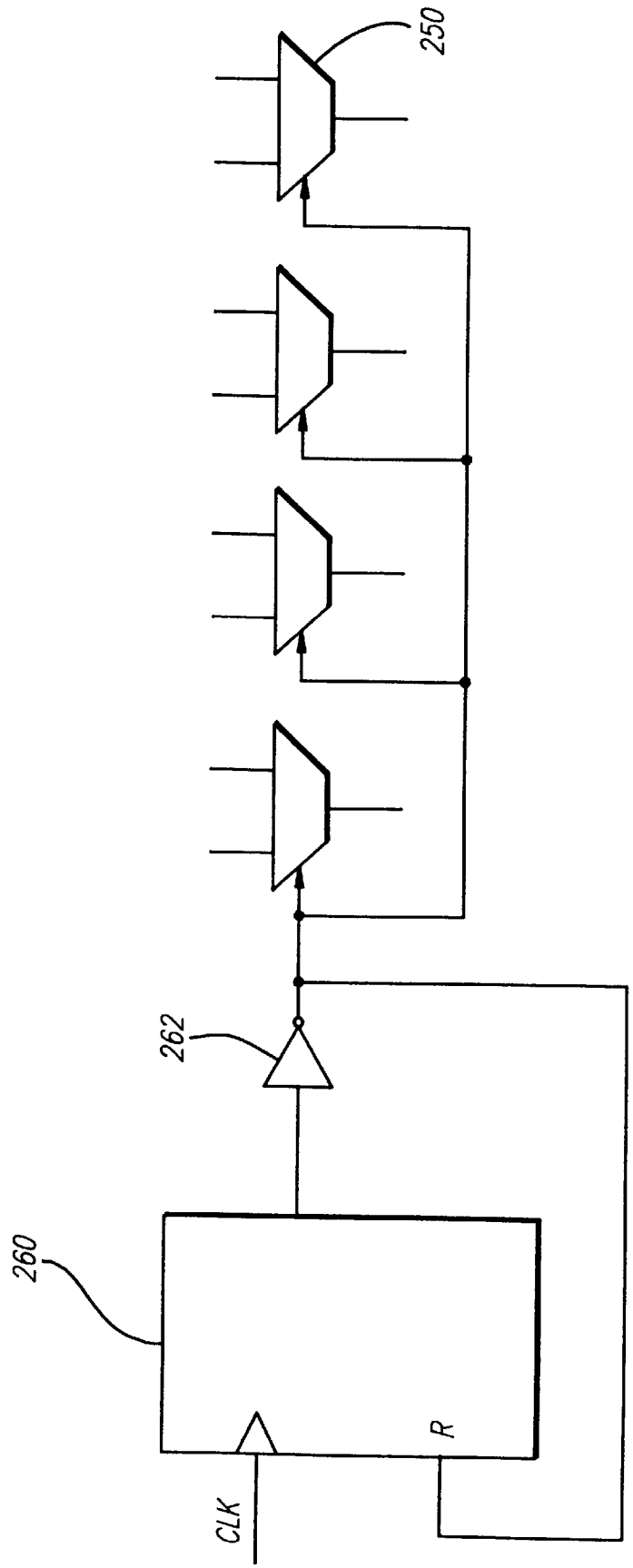
FIG. 3 illustrates a circuit for generating control signals and a set of multiplexers of the second alignment stage.

FIG. 3 shows a circuit for generating in an alternate manner enable signals to the multiplexers 250 shown in FIGS. 2a–2c. As one can see, flip-flop 260 is coupled to an inverter 262 which is further wired to the four multiplexers 250. The output of inverter 262 is also fed back to a gate of the flip-flop 260. In this manner, flip-flop 260 alternatively selects the content of the odd-temporary storage cells in one cycle, and the contents of the even-temporary storage cells in the following cycle and so on.

FIG. 4 shows a pseudo-code listing, in pseudo-VHDL, for the alignment control logic 228. In line 1 of this listing, the processing logic, i.e., pseudo-VHDL, compares the address of the data in the first configuration, i.e., ADRALGSTART, with the address of the data aligned in the second configuration, i.e., ADRALGEND. ADRALGSTART typically denotes the column number at which the data to be transferred starts. Similarly, ADRALGEND denotes the column number at which the data in the second configuration starts. If the first byte in the first configuration of the data to be transferred starts at the same column as the first byte of the data aligned in the second configuration, then the processing logic will generate an ALG 33 22 11 00. ALG 33 22 11 00 means that the alignment logic circuit will map each byte of each row of data to be transferred "transparently." In other words, the byte of data located in column 0 of the source storage device will be transferred to column 0 of the destination storage device, byte 1 in the source storage device will be transferred to byte 1 in the destination storage device, byte 2 will be transferred to the byte 2 of the destination storage device, and byte 3 of the source storage device will be transferred to the byte 3 of the destination storage device. Assuming that the first byte of the first configuration needs to be transferred to a different byte location in the second configuration, then the processing logic of the alignment control logic 228 checks lines 2, 3, and 4 where it determines what type of mapping of data is required. For example, as one can see, depending on the particular way in which data is configured in the second storage device relative to the first storage device, the vectors ALG (32 21 10 03), ALG (31 20 13 02), or ALG (30 23 12 01) are determined. The first vector ALG 32 21 10 03 corresponds to a 3-byte shift of data. In other words, if the first byte of data will appear in the second configuration in a location shifted by 3 bytes, then the alignment processing logic will generate the vector ALG 32 21 10 03. As one can see, during this part of the processing, the processing logic checks to see if the address of a byte positioned in column 0 of the first configuration will be shifted in the second configuration to correspond to column 3, i.e., (ADRALGSTART=0 and AARALGEND≧3). Similarly, if a byte in the source storage device positioned in column 1 will be aligned into byte corresponding to column 0 of the destination storage device or if the source address is 2 and the address in the destination is 1, or if the source address is 3 and the destination address is 2, then the vector ALG 32 21 10 03 will be generated. The other two vectors ALG 31 20 13 02 and ALG 30 23 12 01 will be similarly generated, each corresponding to a different shift in the configuration.

Lines 5, 6, 7, and 8 of the listing shown in FIG. 4 represent the outputs of the multiplexers 216. For example, MUXOUT (31 down to 24) represents the output of the multiplexer corresponding to the most significant 8 bits of a double word in the second configuration. Similarly, MUXOUT (23 down to 16) represents the output of the multiplexer M2 of the first alignment stage. As one can see, the lines 5, 6, 7, and 8 of the alignment processing logic determine which of the inputs ALGIN should be gated to an output MUXOUT of the respective multiplexer. For example, the output of the multiplexer M3 of FIG. 2a will receive the input ALGIN (31 down to 24) when the alignment processing logic detects that the first and the second configurations are identical, i.e., the bytes of data from the block of data to be transferred need not be shifted, but they remain in the same position. As one can see in this case, if the vector ALG 33 22 11 00 equals 1 logic, i.e., this value is TRUE, then the output of the multiplexer M3 is supplied the input ALGIN which corresponds to the most significant byte of the configuration stored in the source storage device. Looking at FIG. 2a in this case, the multiplexer M3 will select the eight bytes which are driven by the line L(3). The line 6, 7, and 8 of the listing similarly determine the outputs at the multiplexers M2, M1, and M0 of the first alignment stage 212 based on the shift in the second configuration relatively to the first configuration. Lines 9, 10, 11, and 12 show how the processing logic determines the second control signals to the second alignment stage 240. More precisely, ENB3LAT denotes the enable control signal to the flip-flops of the second alignment stage. The byte enable signals determine which bytes will be selected on an odd/even cycle. The Enb2latqlr signal is dependent on the starting and ending byte addresses. Once these byte enable signals are determined, these signals alternate every data cycle.

FIGS. 5a and 5b show in tabular form the way in which the first alignment stage shifts bytes of data at the outputs of the four multiplexers in order to provide alignment according to columns. This figure also shows in a tabular form which of the flip-flops of the second alignment stage are enabled in order to provide alignment according to rows. The first column shows the shift in position from the source to the destination. For example, FIG. 5a shows, in the first column and the bottom row of this figure, the case where byte 1 of the first configuration in the source storage device is shifted to the position of byte 3 in the second configuration in the destination storage device, as the example of FIG. 1 illustrates. As one can see from this table, the second column illustrates, for all four multiplexers, the routing of four bytes of input at each multiplexer. For example, B3 to B1 shows that the byte located in the 4th column, i.e., the left-most column of the first configuration, will be moved to the byte, in the second configuration, positioned in column 1, i.e., the second column from the right. Similarly, the other three lines show the shift in byte position for the rest of the bytes. The third column lists the control signals to the temporary storage devices 246 and 248 of the second alignment stage 240. For example, flip-flops S3, S2, $\overline{S1}$, and $\overline{S0}$ will be enabled for aligning data column-wise. This corresponds to FIG. 2b where latches S3, S2, $\overline{S1}$, and $\overline{S0}$ are enabled.

Figure 6:
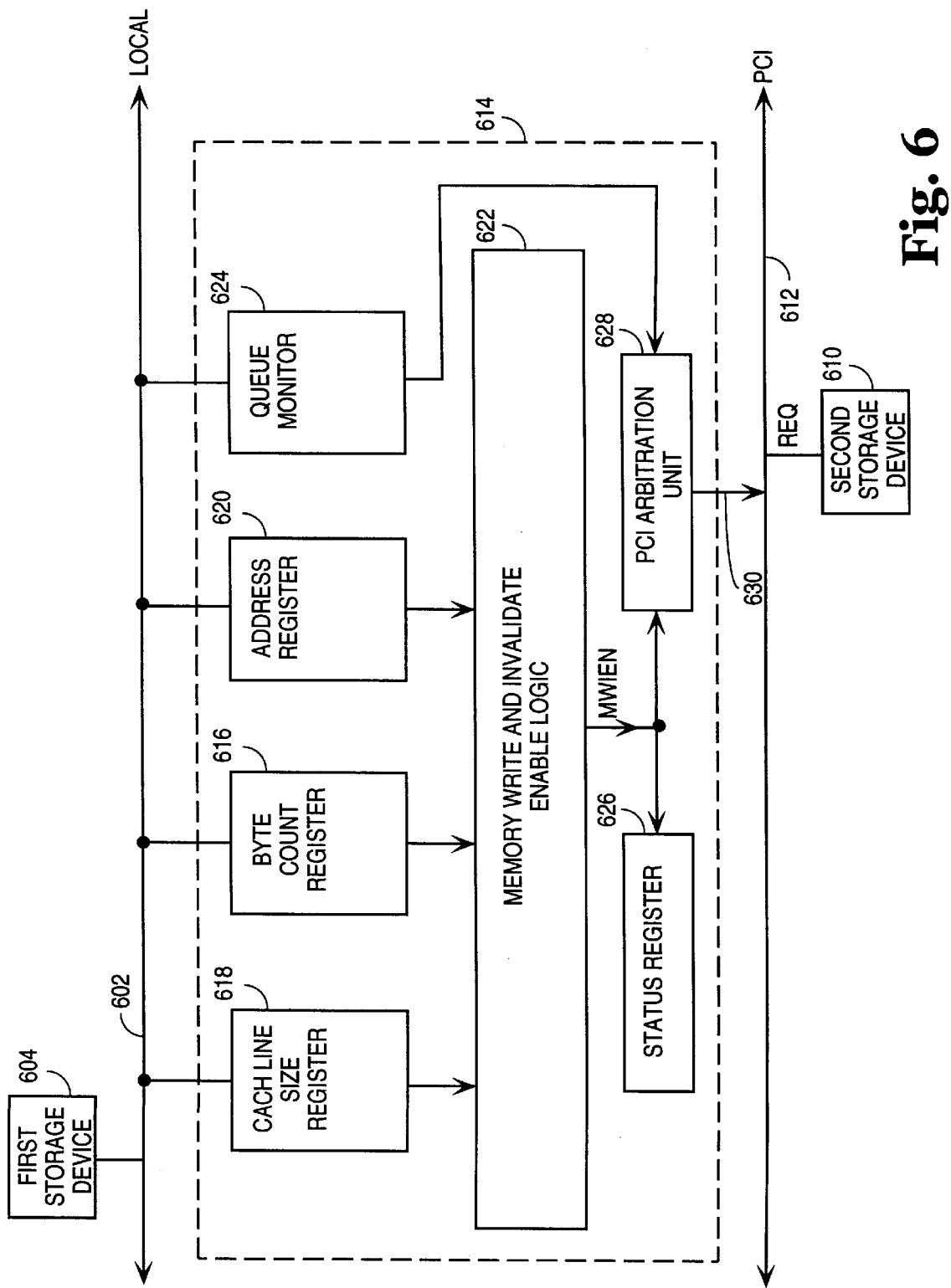
FIG. 6 shows a block diagram of a second embodiment according to the present invention.

FIG. 6 shows a block diagram of a second embodiment of a computer system according to the present invention. A computer system 600 is shown with local bus 602 coupled to first storage device 604. The computer system 612 further includes a peripheral bus 612 which can be, by way of non-limiting example, a PCI bus. A second storage device 610 is coupled to the PCI bus 612. The second storage device can be a cache memory, by way on non-limiting example. Memory 610 is partitioned into a plurality of bytes (not shown) and plurality of cachelines (not shown). Each cacheline includes a first predetermined number N of bytes.

The computer system shown in FIG. 6 further includes a DMA controller 614 (shown in dotted lines) for transferring data between the first storage device 604 and the second storage device 610. The DMA controller includes a first circuit 616 for storing a DMA byte count. The first circuit 616 will be hereinafter referred to as byte count register. The DMA controller includes a second circuit 618 for storing the predetermined number N of storage lines. The second circuit will be hereinafter referred to as "cacheline size register." The DMA controller further includes a third circuit 620 for storing a current transfer address. The third circuit 620 will be hereinafter referred to as "address register." The DMA controller 614 further includes a Memory Write and Invalidate (MWI) enable logic circuit 622 coupled to the cacheline size register 618, to the byte count register 616, and to the address register 620. The Memory Write and Invalidate enable logic circuit generates an enable signal $MWI_{en}$ when the DMA byte count stored in the byte count register 616 is greater or equal than a first predetermined number N, equal with a cacheline size and the current transfer address stored in the address register 620 is a multiple of the first predetermined number N.

FIG. 6 further shows a queue monitor 624 for determining the current number of words of data awaiting transfer in a queue (not shown) of the DMA controller 614. Also a status register 626, coupled to the Memory Write and Invalidate Enable Logic circuit 622, has a bit (not shown) for indicating whether a MWI or a Memory Write (MW) cycle is being performed by the DMA controller. A PCI arbitration unit 628 coupled to the memory write and invalidate enable logic circuit 622 and to the queue monitor 624 generates a request signal 630 to the second bus 612. The PCI arbitration unit typically arbitrates for the PCI bus generating the signal request REQ 630 when the Memory Write and Invalidate Enable Circuit or a Memory Write circuit (not shown) indicates that a MWI or respectfully a MW cycle is pending in the DMA controller. The PCI arbitration unit utilizes a request handshake protocol. When the DMA controller requires the PCI bus, it will assert its request REQ# output.

The status register 626, as explained above, includes a bit which can be set to 0 or 1, indicating whether a memory write (0) or a memory write and invalidate (1) needs to be executed. The memory write command is a command compatible with the PCI system architecture which is used to update data in the memory. A memory write and invalidate (MWI) command is semantically identical to the memory write command except that it additionally guarantees a minimum transfer of one complete cacheline during the current transaction. According to this command the master (DMA controller) intends to write all bytes within the address cacheline in a single PCI transaction unless the master is interrupted by the target (second storage device 610). This command allows a memory performance optimization by invalidating a (dirty line) in a write-back cache without requiring the actual write-back cycle, thus shortening access time. More information about the PCI systems and the memory write and invalidate command can be found in the PCI Local Bus Specification, revision 2.1 of the PCI Special Interest Group located in Portland, Oreg.

To satisfy the PCI requirements for a memory write and invalidate command, a PCI master such as the DMA controller 614 shown in FIG. 6 must start a transaction on a cacheline boundary and transfer at least one cacheline of data without interruption. A cacheline boundary is defined as the boundary between two adjacent cachelines. The present invention provides for circuitry permitting the requirements of PCI and implementing a hardware mechanism able of handling a DMA transfer between the local (first) and the peripheral (second) storage devices by using a single DMA chain descriptor.

Figure 7:
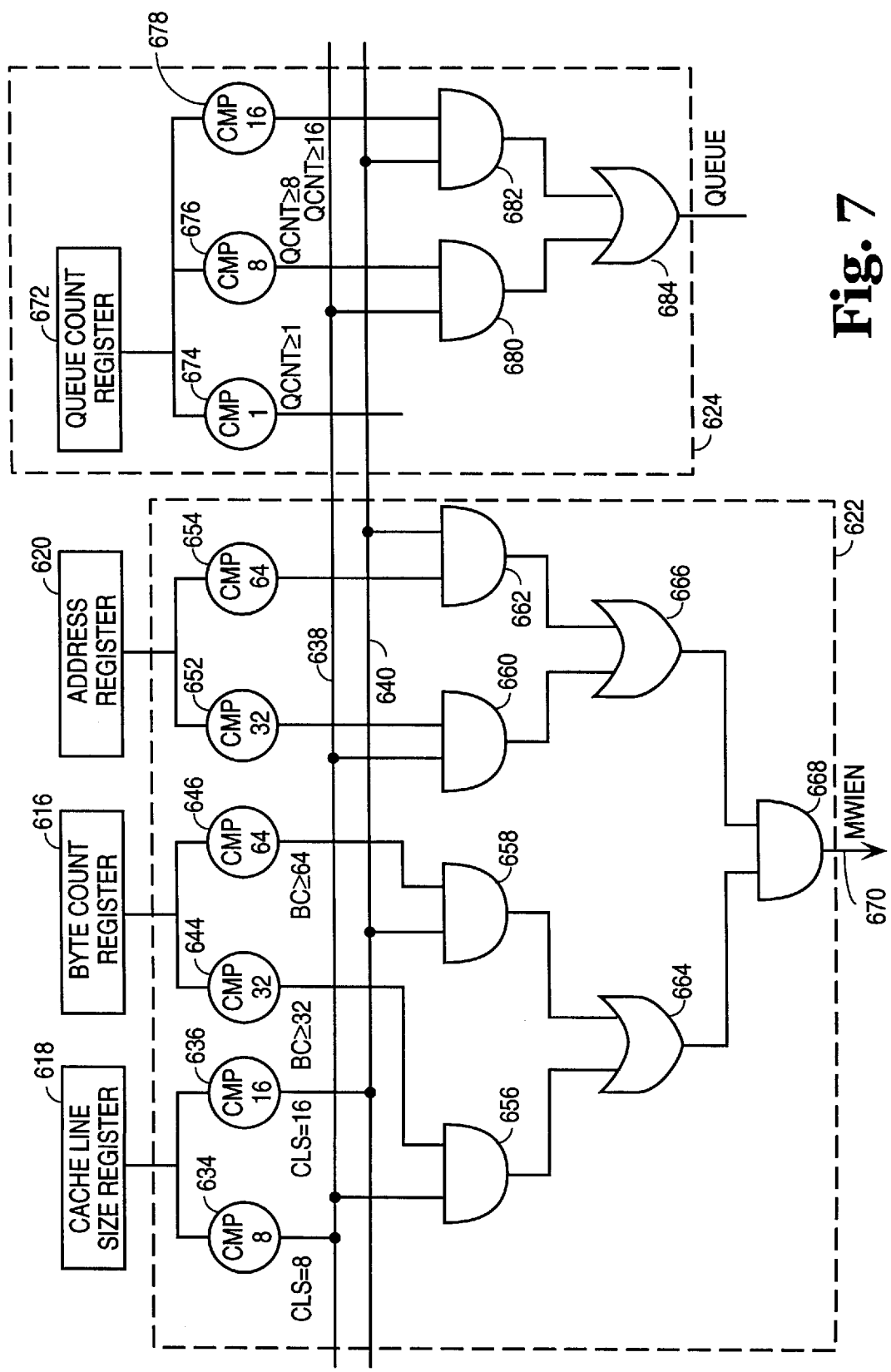
FIG. 7 shows in more detail a second embodiment according to the present invention.

FIG. 7 shows a more detailed illustration of the DMA controller of FIG. 614. The Memory Write and Invalidate enable logic circuit 622 is shown in this figure as including comparators 634, 636, 644, 646, 652, and 654. The functioning and interconnections of these comparators will be further explained in conjunction with the rest of the structure of the DMA controller 614. The cacheline size register 618 typically stores the predetermined number N of bytes which defines the length of a cacheline. Typically a cacheline can have 8 or 16 double-words, but is not limited to these numbers. The MWI enable logic circuit includes comparators 634 and 636 for comparing the cacheline size register 618 with a number 8 or 16 respectively. Depending on what the value of the first predetermined number N stored in the cacheline size register 618 one of the comparators 634 or 636 will output a high signal 1. For example, assuming that the cacheline size register 618 contains the predetermined number 8, the comparator 634 will output a high signal at line 638. However, if the predetermined number stored in register 618 is 16, the comparator 636 will output a high signal at the output of this comparator. Comparator 636 is coupled at its output to line 640. The DMA controller 614 further includes the byte count register 616. The byte count register 616 typically stores the current number of bytes of data to be transferred in a typical DMA transaction. Comparators 644 and 646 are coupled to the byte count register 616 for comparing the current byte count, with either the number 32 or 64 respectively. Depending on whether the cacheline size is 8 double words or 16 double words, and the byte count register includes a byte count that is equal or larger than 32 or equal or larger than 64, the comparators 644 and respectively 646 will output a high logic signal.

The address register 620 stores the current transfer address of a destination storage location in the second storage device. Comparators 652 and 654 which are coupled to the address register 620 determine whether the current transfer address stored in the address register 620 is a multiple of the first predetermined number N stored in the cacheline size register 618. More specifically, comparator 652 checks if the five least significant bits of the current transfer address are zero. In case the five least significant bits of the current transfer address are all equal with zero, then it is determined that the current transfer address is a multiple of the first predetermined number N, i.e., 32. Similarly, the comparator 654 checks if the six least significant bits, of the current transfer address stored in the address register 620, are all zero. If the six least significant bits, of the current transfer address, are all zero, then it is determined that the current transfer address is a multiple of 64. Therefore, depending on whether a cacheline size is 8 double-words (32 bytes) or 16 double-words (64 bytes), comparators 652, 654, will generate a high logic signal, if the current transfer address is a multiple of 32, respectively, 64.

The Memory Write and Invalidate enable logic circuit further includes the AND gate 656 coupled to line 638 and to the comparator 644. The gate 656 will output a signal having logic value 1 if the cacheline size is determined to be 8 and the byte count register is determined to be equal or greater than 32. The Memory Write and Invalidate enable logic circuit further includes AND gate 658 which is coupled at its input to line 640 and with a comparator 646. The AND gate 658 will output a signal having logic value 1 if it is determined by the comparator 636, that the cacheline size is 16 and the byte count in the byte count register 616 is equal or greater than 64. The outputs of gate 656 and 658 are further coupled to an OR gate 664. If any of the gates 656 or 658 output a signal having logic value 1 (i.e. if the byte count is greater than or equal to the cacheline size), then the output of the OR gate 664 will be set to 1.

The Memory Write and Invalidate enable logic circuit 622 further includes an AND gate 660 which has an input coupled to line 638 and another input coupled to the comparator 652. The AND gate 660 is used to determine whether the current transfer address is on a cacheline boundary. Assuming that the cacheline size is determined to be 8, by the comparator 634, if the comparator 652 determines that the current transfer address is a multiple of 8, then the output will be set to logic level 1. Accordingly, the output of gate 660 will be high. Similarly, an AND gate 662 which has an input coupled to line 640 and another input coupled to comparator 654 generates a high signal at its output if it is determined by comparators 636 and 654, respectively, that the cacheline size is 16 and the current transfer address stored in the address register 620 is a multiple of 16. OR gate 666, which is coupled to gates 660 and 662, will output a high signal if any of its inputs are set at 1. In other words, if it is determined that the current transfer address is a multiple of the cacheline size, whatever the cacheline size might be, then the output of the gate 666 will be set at logic level 1. The MWI enable logic circuit 622 also includes the AND gate 668 having one input coupled to the output of gate 664 and another input coupled to the output of gate 666. The gate 668 will output a signal $MWI_{en}$ if both of its inputs are set at logic level 1. In other words, the output of gate 668 will be 1 if both the byte count register is equal to or greater than a cacheline and the current transfer address is on a cacheline boundary, i.e. the current transfer address is a multiple of the cacheline size. If the current transfer address is on a cacheline boundary and the byte count register is equal to or greater than a cacheline, a MWI cycle is enabled by a bit in the status register 626 (shown in FIG. 6) which is updated by the $MWI_{en}$ signal 670. If, however, either an address is not on a cacheline boundary or the byte count register shows that the byte count is smaller than a cacheline, the DMA forces memory writes by having the gate 668 drive a "0" instead of a "1" in the status register 626 during an address cycle.

Assuming that the byte count is large enough to continue a transfer (i.e. the byte count is larger than the cacheline size but the current address is not on a cacheline boundary the DMA 314 will transfer bytes using a memory write cycle. This will typically be the case at the beginning of a DMA transfer when the first byte is not aligned on a cacheline boundary. Once a respective number of bytes, less than a cacheline size, has been transferred by a memory write mechanism and, thus, the first current byte in the queue is on a cacheline boundary, the MWI enable logic circuit 622 will output an $MWI_{en}$ signal to enable a MWI transfer. However, if the last bytes, of a block of data to be transferred via the DMA controller, are less than the cacheline size, then even though the current transfer address is a multiple of a cacheline size, the rest of the bytes will be transferred by using a MW mechanism. A single chain descriptor can thus be used to provide memory writes followed by memory write and invalidate, and ending with memory write.

The queue count monitor 624 is illustrated in more detail in FIG. 7 in dotted line. The queue count monitor 624 includes a queue count register 672 which typically stores a current number of double-words awaiting transfer in a queue (not shown) of the DMA controller 614. The queue monitor 624 includes comparator 674, comparator 676, and comparator 678. Comparator 674 compares the current number of double-words waiting in the queue and stored in the queue count register 672 with "1" and outputs a signal queue count greater or equal than $QCNT \geq 1$. If the queue count is greater or equal than 1, then the signal output by the comparator 674 will be 1. Comparator 676 compares the current number of bytes of data awaiting transfer in the queue count register 672 with a number "8." This comparator will output the signal $QCNT \geq 8$ which will be set high if the queue count is greater or equal than 8. Comparator 678, similarly, compares the queue count stored in queue count register 672 with the number "16" and outputs a signal $QCNT \geq 16$ if the current number of bytes of data is equal or greater than 16. The queue monitor 624 further includes AND gate 680 having an input coupled to the line 638 and another input coupled to the output of the comparator 676. If the cacheline size is 8 and the queue count is greater or equal than 8 gate 680 will output a signal having logic level 1. Similarly an AND gate 682 has an input coupled to comparator 678 and another input coupled to the line 640. If the cacheline size is 16 and the queue count is equal or larger than 16 the gate 682 will output a signal having logic value 1. The queue monitor 624 further includes an OR gate 684 which has an input coupled to the output gate 668 and another input coupled to the output of gate 682. Gate 684 outputs a signal QUEUE having a logic value 1, if either of the gates 680 or 682 generates a signal having the logic value 1. More specifically gate 684 outputs a signal QUEUE having logic level 1 if the queue contains a number of words equal or greater than the cacheline size. This circuit is to ensure that in the case that the byte count register includes a number of bytes equal or larger than the cacheline size but due to proportion delay time, the queue count has become lower than a cacheline size, a PCI request circuit, which will be explained in conjunction with FIG. 8, will not issue a PCI request to the PCI bus.

Figure 8:
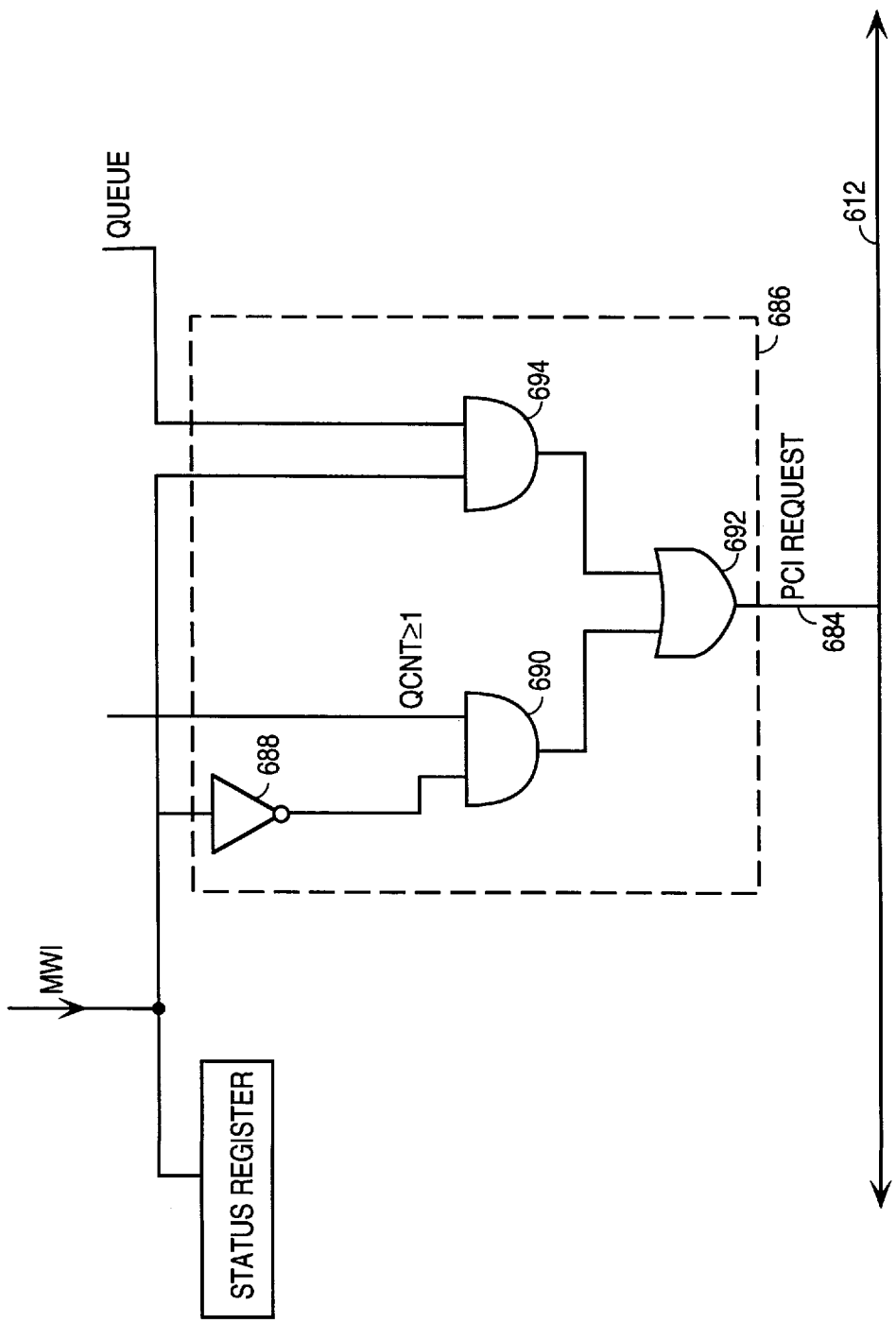
FIG. 8 shows a PCI request circuit according to the present invention.

FIG. 8 shows a sixth circuit, hereinafter refined to as a PCI request circuit 686. The PCI request circuit is coupled to the MWI enable logic circuit and to the queue monitor shown in FIGS. 6 and 7. Circuit 628 generates a PCI REQUEST signal 684 to the PCI arbitration unit shown in FIG. 6. The PCI request circuit includes inverter 688 coupled to the output of the MWI enable logic circuit. The PCI request circuit further includes AND gate 690 having an input coupled to the output of the inverter 688 and another input coupled to the queue monitor 624 for receiving the signal $QCNT \geq 1$. Gate 690, thus, provides a high signal if more than one word is found in the queue of the DMA controller and the DMA controller is in a memory write cycle.

OR gate 692 is coupled at a first input to the output of gate 690 and at a second input thereof to gate 694 to an output of AND gate 694. AND gate 694 has an input coupled to the MWI enable logic circuit and another input coupled to the queue monitor for receiving the QUEUE signal. Accordingly, gate 694 will generate logic level 1 signal if the DMA controller is in a memory write and invalidate cycle and the QUEUE signal indicates that the queue count is greater than a cacheline size. Accordingly, the PCI request circuit 686 will generate a high PCI REQUEST signal if the DMA is in a memory write and the queue count is greater or equal than 1 or if the DMA is in a memory write and invalidate cycle and the queue count is equal or larger than a cacheline size.

Figure 9:
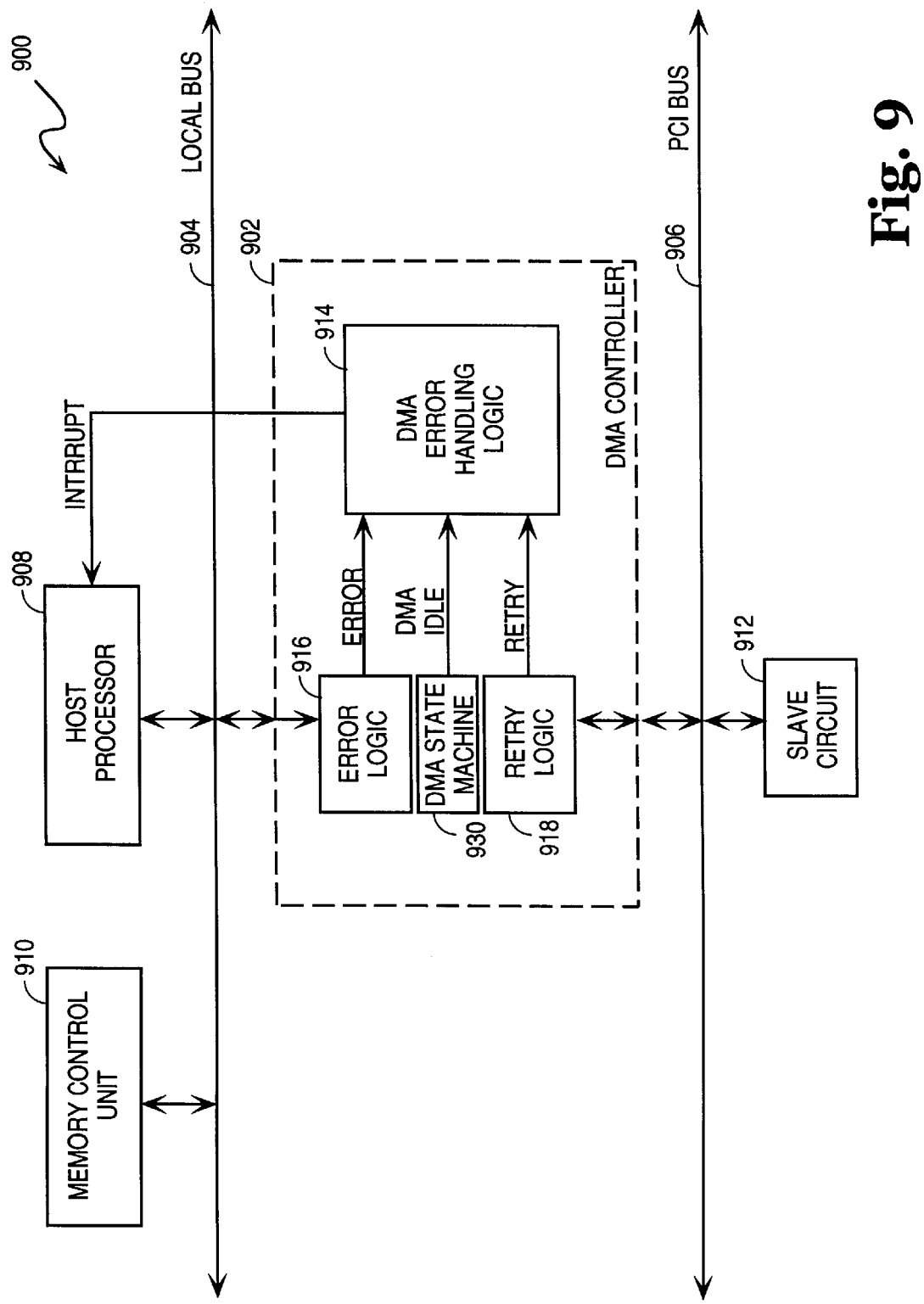
FIG. 9 shows a third embodiment of a computer system according to the present invention.

FIG. 9 shows a third embodiment according to the present invention. The system 900 includes a first bus 904, hereinafter referred to as a local bus, and a second bus 906, hereinafter referred to as a PCI bus. The computer system according to the present invention further includes a host processor 908 coupled to the local bus 904 and a memory control unit 910 also coupled to the local bus 904. The computer system 900 also includes a slave circuit 912 coupled to the PCI bus 906. Moreover, the computer system 902 includes a Direct Memory Access (DMA) controller 902 with a DMA error handling logic 914, coupled to the host processor 908. The DMA error handling logic 914 has an input for receiving an ERROR signal indicative of an error on the local bus 904. The DMA error handling logic 914 further has a second input for receiving a RETRY signal indicative of a retry request of the slave circuit 912. The DMA error handling logic 914 has an output, coupled to host processor 908, for aborting a DMA transfer when the ERROR signal is asserted and the RETRY signal is deasserted.

Figure 10:
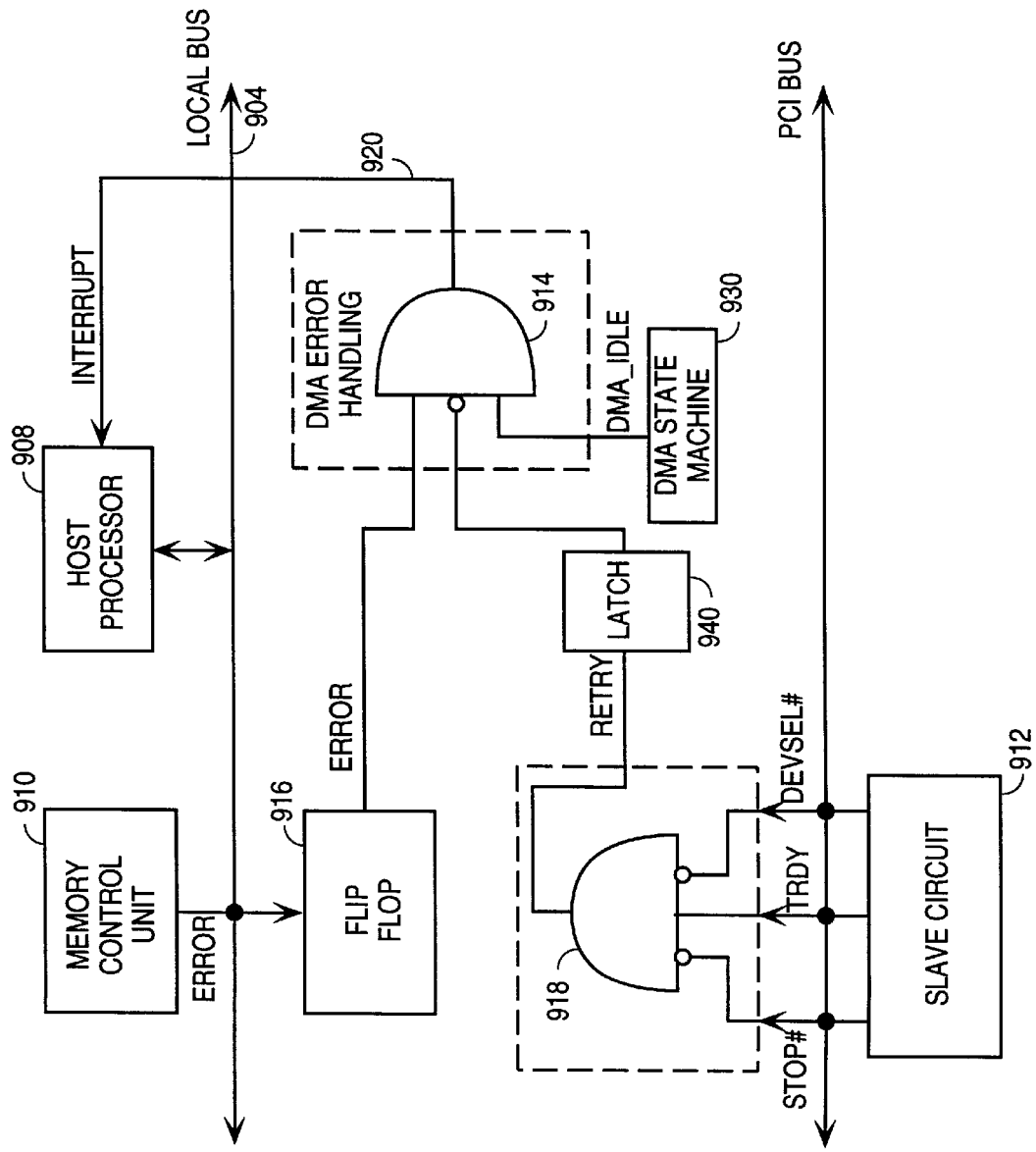
FIG. 10 shows a more detailed representation of this third embodiment of the computer system according to the present invention.

FIG. 10 illustrates in more detail the structure of the DMA controller 902 of the computer system according to the present invention. The computer system according to the present invention is complying to PCI system architecture. A Retry request in PCI compliant computer systems, is typically generated by a slave circuit to a master circuit such as the DMA controller 914 if the slave can not respond to a transaction at the current time. The slave will signal "Retry" to the master and terminate the transaction. The master will respond by ending the transaction in course and then retrying it later. An example of the need for a Retry would be if the slave is currently locked for exclusive access by another master. A Retry is generally indicated to the master by the slave circuit asserting a signal STOP# and deasserting a signal TRDY# while keeping the DEVSEL# asserted. This indicates to the master that the target that the slave does not intend to transfer the current data item (TRDY# deasserted) and that the master must stop the transaction # (STOP# asserted). The continued assertion of DEVSEL# indicates that the master must Retry the transaction at a later time. The master, i.e., the DMA controller can not terminate the DMA transfer until the Retry is satisfied.

Error logic circuit 916 is implemented, by way of non-limiting example, as a flip-flop. Flip-flop 916 receives an ERROR signal from the memory control unit 910 indicative of an error on the local bus 904. This ERROR can be a local bus parity error or a bus fault. The flip-flop 916 latches the ERROR signal sent by memory controller 910 and gates it to an output thereof. A Retry logic circuit is shown in the embodiment illustrated in FIG. 10 as a first AND gate 918. Gate 918 has a first inverted input for receiving a STOP# signal from the slave circuit 912. Gate 918 further has a second input for receiving a signal TRDY, and a third inverted input for receiving a signal DEVSEL#. The signals STOP#, TRDY, and DEVSEL# are PCI signals. The PCI 2.1 revised version explains these signals in more detail. The Retry logic circuit will generate at its output a RETRY signal if the PCI conditions for a Retry are fulfilled. Accordingly, if the STOP# signal is asserted, the TRDY# signal is deasserted, and the DEVSEL# signal is asserted, the output of the AND gate 918 will be set at logic level 1.

The DMA controller 914 further includes the DMA error handling logic which in this particular embodiment includes a second AND gate 914. AND gate 914 has an input for receiving the ERROR signal from the flip-flop 916 and a second inverted input for receiving the RETRY signal. Accordingly, if an ERROR is detected by the memory control unit 910 and is gated to the flip-flop 916, the DMA error handling logic 914 will assert at an output thereof, a signal having logic level 1 if the ERROR signal is asserted and the RETRY signal is deasserted.

The retry signal will be deasserted once the retry is serviced and the $\overline{\text{STOP\#}}$ will have the logic level value at zero. In this condition, the output of the gate 918 will be set at zero logic and, thus, taking into account that this signal is fed into the inverted input of AND gate 914, the output of gate 914 will be set at 1. At this time, after the retry has been serviced by the DMA controller (RETRY signal deasserted), the error status of the local bus 904 will be mode "visible" to the host processor. Interrupt line 920, which is fed to an interrupt input pin of the host processor 908, will cause the host processor 908 to abort the DMA transfer.

In the foregoing specification, the invention has been described with reference to specific embodiments thereof. It will however be evident that various modifications and changes can be made thereto without departing from the broader spirit and scope of the invention as set forth in the appended claims. The specification and drawings are, accordingly, to be regarded in an illustrative rather than a restrictive sense. Therefore, the scope of the invention should be limited only by the appended claims.

What is claimed is:

1. An apparatus to transfer segments of data from a first storage device to a second storage device, said apparatus comprising:

first alignment stage coupled to said first storage device;

said segments of data aligned in said first storage device in first and second dimensions according to first configuration, and in said second storage device in said first and second dimensions according to a second configuration;

second alignment stage, coupled at an input thereof to said first alignment stage and at an output thereof to said second storage device, said second alignment stage including even and odd temporary devices;

alignment control logic to generate first control signal to said first alignment stage to supply to said second alignment stage said segments of data aligned in said first dimension according to said second configuration and to generate second and third control signals to said even and odd temporary storage devices respectively to align said segments in said second dimension according to said second configuration and to provide said segments of data from said even and odd temporary storage devices to said second storage device in consecutive cycles.

2. The alignment logic circuit of claim 1 wherein said first and second storage devices are partitioned into rows and columns, each intersection of a row and a column defining a storage location for storing one segment of data.

3. The alignment logic circuit of claim 2 wherein said first dimension corresponds to a column of said storage devices and said second dimension corresponds to a row of said storage devices.

4. The alignment logic circuit of claim 3 wherein said first configuration has a source address which corresponds to a source row and a source column, said second configuration having a destination address which corresponds to a destination row and a destination column.

5. The alignment logic circuit of claim 4 wherein said segments of data comprise bytes, each row of said storage devices including a predetermined number N of bytes B(i) for i equal to 0 through N−1.

6. The alignment logic circuit of claim 5 further including a first bus coupled to said storage device, wherein said bus includes N 8-bit lines L(i) for i equal 0 through N−1, each of said lines L(i) corresponding to one byte B(i) for i equal 0 through N−1.

7. The alignment logic circuit of claim 6 wherein said first alignment stage includes N first multiplexing devices M1(i) for i equal 0 through N−1, each of said multiplexing devices M1(i) having an input, coupled to one of said lines L(i) for i equal 0 through N−1, an output, and a control gate coupled to said alignment control logic.

8. The alignment logic circuit of claim 7 wherein said second alignment stage includes N odd temporary storage devices S1(i) and N even temporary storage devices S2(i) for i equal 0 through N−1, each of said S1(i) and S2(i) having an input coupled to said output of said multiplexing devices M(i) for i equal o through N−1, each of said temporary storage devices having an output, each of said temporary storage devices having a control gate coupled to said alignment control logic.

9. The alignment logic circuit of claim 7 wherein said second alignment stage further includes N second multiplexing devices M2(i) for i equal 0 to N−1, each of said second multiplexing devices M2(i) having a first input coupled to said odd temporary storage devices S1(i) and a second input coupled to said even temporary storage devices S2(i) for i equal 0 through N−1, said second multiplexing devices having a control input.

10. A method for transferring segments of data between first and second storage devices, said segments of data aligned in said first storage device in first and second dimensions according to a first configuration and in said second storage device according to a second configuration, the method comprising:

aligning segments of data in a first dimension according to a second configuration;

aligning said segments of data, aligned in said first dimension according to said second configuration, in a second dimension in odd and even temporary storage devices; and transferring said segments of data from said odd and even temporary devices to said second storage device in consecutive cycles.

* * * * *